(12) United States Patent
Allam

(10) Patent No.: US 6,893,222 B2
(45) Date of Patent: May 17, 2005

(54) TURBINE BALANCING

(75) Inventor: Mahdy A. Allam, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 51 days.

(21) Appl. No.: 10/361,364

(22) Filed: Feb. 10, 2003

(65) Prior Publication Data

US 2004/0156708 A1 Aug. 12, 2004

(51) Int. Cl.$^7$ ................................. F01D 5/10
(52) U.S. Cl. .................. 416/144; 416/500; 415/119; 29/889.1; 29/889.2; 29/402.4; 29/402.6
(58) Field of Search ................ 415/119; 416/144–145, 416/500, 198 A; 29/889.1, 889.2, 402.04, 402.06, 402.14, 525.01, 557

(56) References Cited

U.S. PATENT DOCUMENTS

| | | | | |
|---|---|---|---|---|
| 4,220,055 A | * | 9/1980 | Dubois et al. ............ 74/573 R |
| 4,270,259 A | * | 6/1981 | Tichy et al. ............... 29/402.6 |
| 4,803,893 A | * | 2/1989 | Bachinski ................... 74/572 |
| 5,369,882 A | * | 12/1994 | Dietz et al. ............... 29/889.1 |

* cited by examiner

Primary Examiner—Ninh H. Nguyen
(74) Attorney, Agent, or Firm—Bachman & LaPointe, P.C.

(57) ABSTRACT

A turbine disk has an at least partially radially-extending first portion. An at least partially axially-extending circumferential flange has a root connecting the flange to the first portion. The flange extends to a rim and has a plurality of pairs of first and second weight-mounting fastener apertures. A plurality of first recesses are provided in the rim, each position between an associated first and second aperture of an associated one of the aperture pairs. A plurality of second recesses are provided in the rim each positioned between an adjacent two of the pairs.

21 Claims, 3 Drawing Sheets

TURBINE BALANCING

BACKGROUND OF THE INVENTION (1) Field of the Invention

This invention relates to balancing of turbine rotors by the addition of weights, and more particularly to rotor flanges to which the weights are mounted.

(2) Description of the Related Art

The dynamic balancing of turbine rotors is a well-developed art. Each rotor may have, at one or more longitudinal locations, a circumferential array of mounting features permitting the installation of one or more balance weights.

It is known, for example, to balance a rotor by using a computer-controlled apparatus to spin the rotor about its rotational axis and measure the parameters of rotational displacements associated with imbalance. Based upon these measurements, the computer outputs an identification of a particular combination of balance weights to balance the rotor. Specifically, the computer may identify particular weight masses to be installed at one-to-all of the individual mounting locations defined by the mounting features.

BRIEF SUMMARY OF THE INVENTION

Accordingly, one aspect of the invention involves a turbine disk having an at least partially radially-extending first portion. An at least partially axially-extending circumferential flange has a root connecting the flange to the first portion. The flange extends to a rim and has a plurality of pairs of first and second weight-mounting fastener apertures. A plurality of first recesses are provided in the rim, each position between an associated first and second aperture of an associated one of the aperture pairs. A plurality of second recesses are provided in the rim each positioned between an adjacent two of the pairs.

Other aspects of the invention relate to remanufacturing a turbine disk. The disk initially has a plurality of recesses in its balancing flange rim, each positioned between a first aperture of one aperture pair and adjacent second aperture of an adjacent aperture pair. The method may involve broadening such recesses. The method may involve adding a plurality of additional recesses in the rim, each positioned between first and second mounting apertures of an associated mounting aperture pair. The method may also involve longitudinally trimming the rim.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
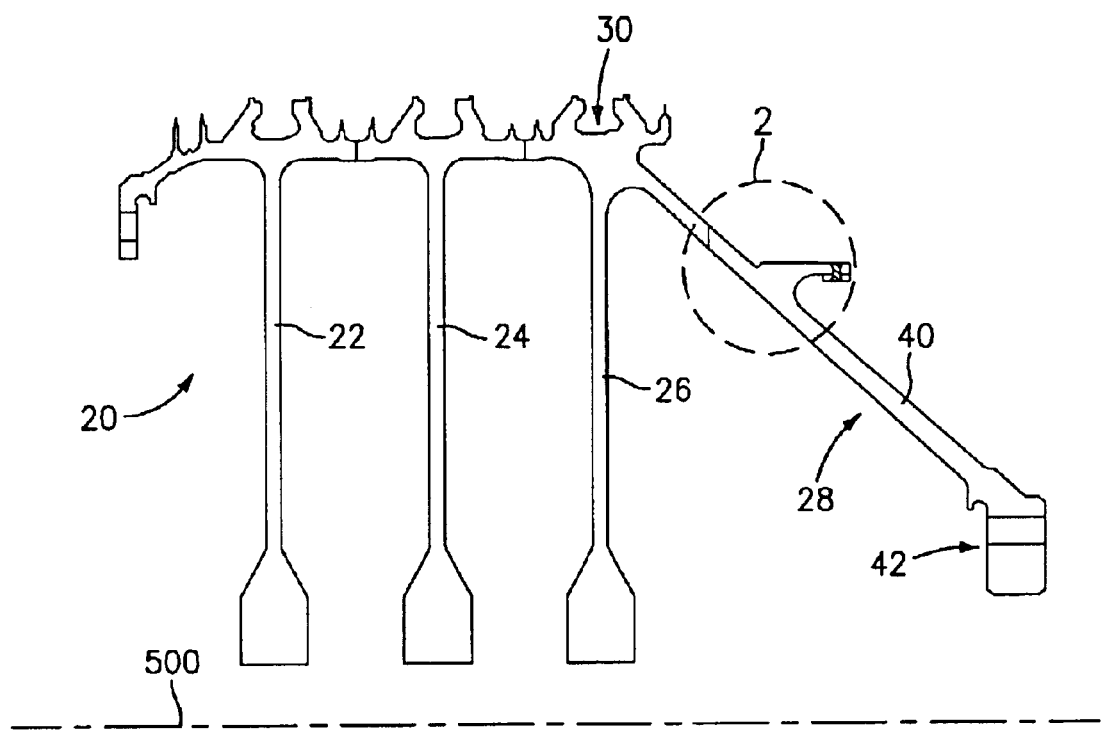
FIG. 1 is a partial longitudinal sectional view of a turbine engine high pressure compressor rotor.
Figure 2:
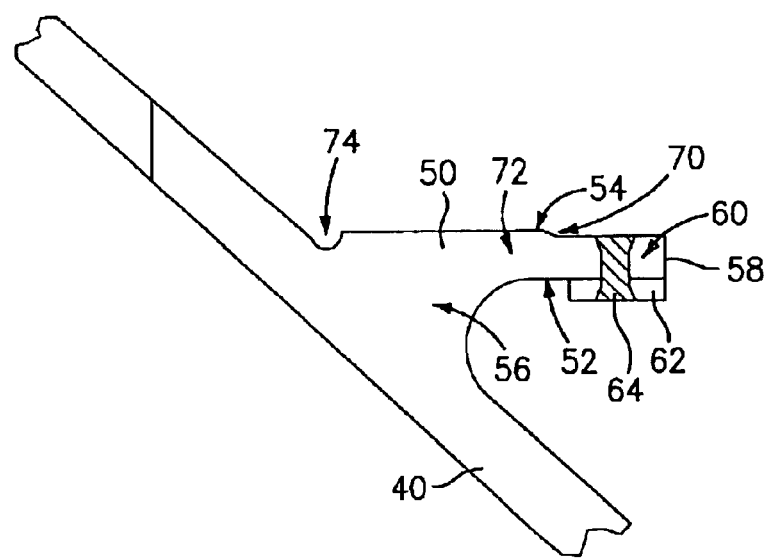
FIG. 2 is an enlarged view of a balance flange of the rotor of FIG. 1.

FIG. 1 shows a rotor 20 of a turbine engine high pressure compressor section. From fore to aft, the rotor includes three blade disks 22, 24, 26 and a rear disk or hub 28 secured to each other such as by welding. The rotor has a central longitudinal axis 500 which is a central longitudinal axis of the engine and an axis about which the rotor rotates. The periphery of each blade disk has mounting features 30 for mounting a circumferential array or stage of blades (not shown).

In the exemplary embodiment, the rear hub 28 has a frustoconical web 40 extending aft and radially inward from a junction with the rear blade disk 26 to a flange 42 for mounting to a high spool shaft (not shown). The rear hub 28 has a balance flange 50 extending generally longitudinally aft from the web 40. The exemplary flange has inboard and outboard surfaces 52 and 54 and extends from a relatively thick root 56 at the web 40 to an aft rim 58. A relatively thin distal or aft mounting portion 60 extends to the rim 58 and is provided with mounting apertures (discussed below) for the securing of weights 62 by means of fasteners 64 (e.g., rivets or threaded fasteners). In the exemplary embodiment, the flange inboard surface 52 has a smooth continuously curving transition to the outboard/aft surface of the web 40 and smoothly extends to a distal longitudinal portion along the mounting portion 60. The flange outboard surface 54 has a shoulder or step 70 at the fore/proximal end of the mounting portion 60, extending generally longitudinally fore and aft of the step. An intermediate portion 72 extends forward from the shoulder 70 with inboard and outboard surfaces initially parallel and then transitioning as described above. At the exemplary root 56 the outboard surface defines a slight channel 74 which facilitates machining of the surface 54.

Figure 3:
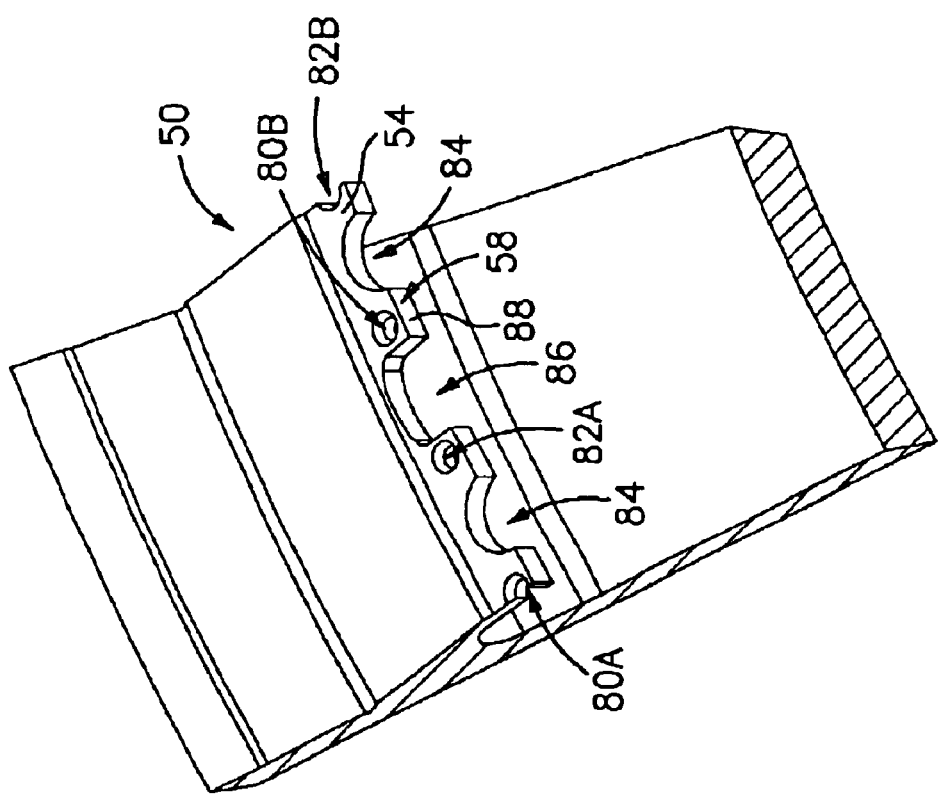
FIG. 3 is a partial cutaway view of a rotor hub and balance flange according to principles of the invention.

FIG. 3 shows further details of the balance flange 50 with weights removed. The mounting apertures are provided in pairs. FIG. 3 shows a first pair of first and second apertures 80A and 82A and a second pair of first and second apertures 80B and 82B. Each of the apertures is formed as a cylindrical radially-extending hole frustoconically beveled at the outboard surface 54 for accommodating an end (e.g., the head) of an associated one of the fasteners 64. The exemplary flange rim 58 has two groups of recesses 84 and 86, extending forward from a flat broken annular portion 88, the unbroken part of which form flats of islands between adjacent recesses). Each recess 84 lies circumferentially between a pair of apertures for mounting a given weight. Each recess 86 lies between two adjacent pairs. The recesses may function to reduce weight and relieve hoop stress in the mounting portion 60.

Figure 4:
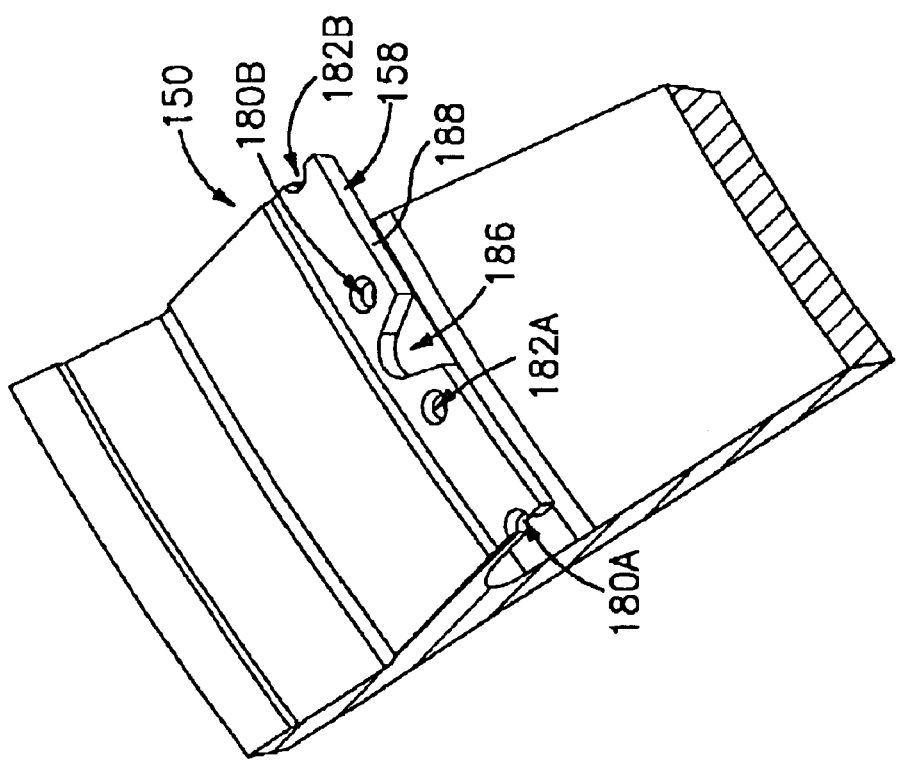
FIG. 4 is a partial cutaway view of a prior art rotor hub and balance flange.

FIG. 4 shows an exemplary prior art balance flange 150 wherein analogous portions to the flange 50 are shown with like numerals incremented by one hundred. The flange has a rim 158 and similar (identical in an exemplary embodiment) pairs of mounting apertures 180A, 182A, 180B, 182B. The flange only has recesses 186 between adjacent aperture pairs and not between apertures of a given pair. Accordingly, the rim flats of broken portion 188 are of greater circumferential extent than those of the flange 50. Additionally, the recesses 186 are narrower than the recesses 86. This narrowness may be measured at various longitudinal positions relative to the common plane of aperture centerlines (or intersections thereof with the projection of the flange outboard surface). Furthermore, the recesses 186 have a greater amount of aft-to-fore taper and the rim broken portion 188 is more rearwardly spaced stet the apertures (e.g., the mounting portion is longer in the flange 150 than in the flange 50).

The flange 150 may be remanufactured in one or more ways to more closely resemble the flange 50. The recesses 186 may be machined to broaden them and make them more blunt. The rim may be trimmed by machining to longitudinally shift the broken annular portion 188 forward. The second plurality of the recesses can be machined between adjacent apertures of each pair.

Figure 5:
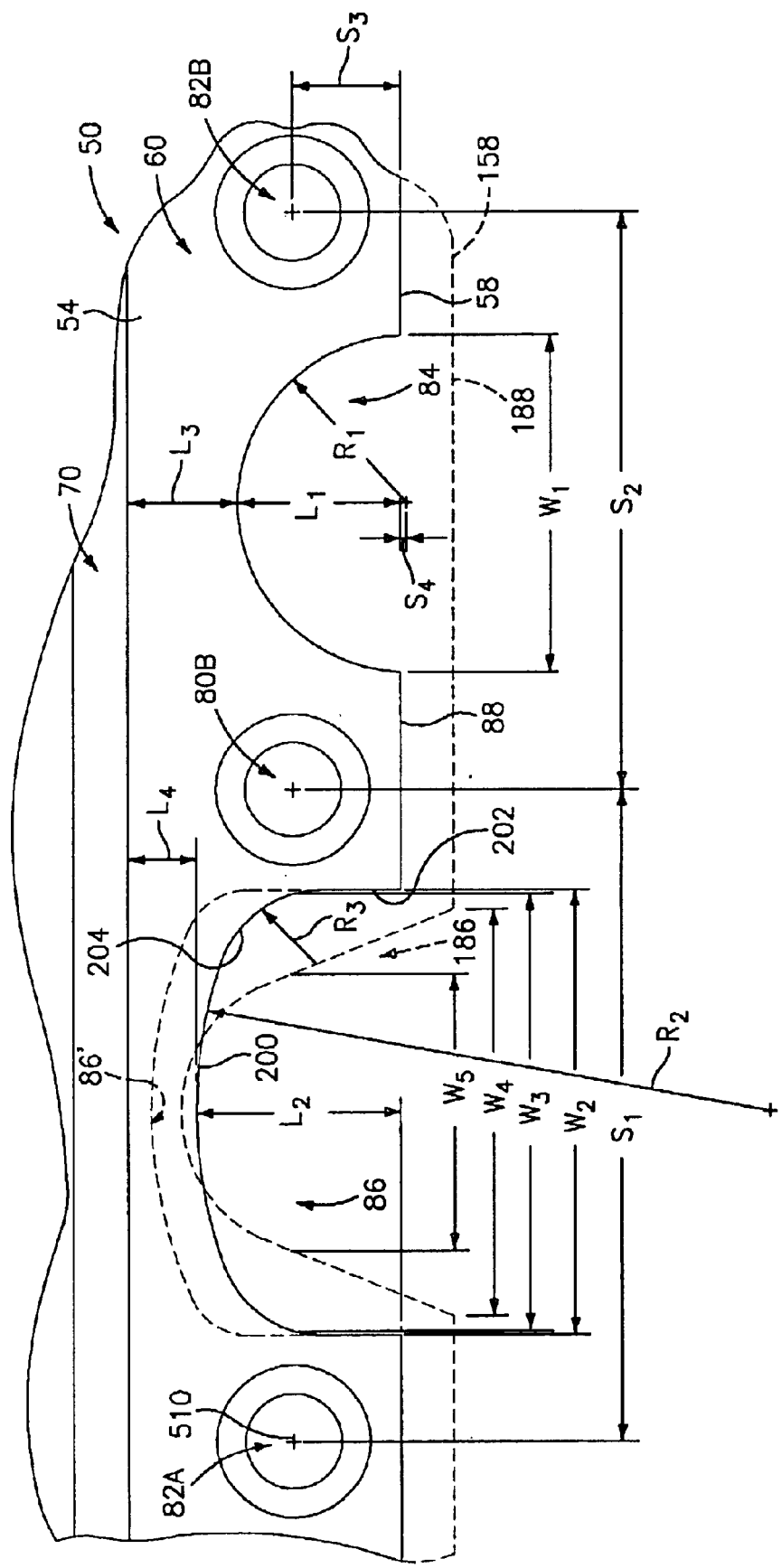
FIG. 5 is a partial radial view of a balance flange.

FIG. 5 is a view of the circumferential outboard surface 54 of the flange 50. FIG. 5 shows slightly more than one cycle of mounting features along the flange, specifically showing apertures 82A, 80B and 82B, each having an axis 510. There is a circumferential spacing $S_1$ between axes of apertures of a given pair and a circumferential spacing $S_2$ between adjacent apertures of adjacent pairs. The spaces are advantageously different to prevent weights from erroneously being secured to one aperture each of an adjacent pair. In an exemplary embodiment, the spacing $S_2$ is slightly smaller than the spacing $S_1$. The axes 510 are recessed forwardly of the rim annular portion 88 by a distance $S_3$. An exemplary recess 84 has a uniform radius of curvature $R_1$ with a center of curvature offset rearwardly of the annular portion 88 by a distance $S_4$ so that a width $W_1$ of the recess at the annular portion 88 is slightly less than twice $R_1$ and a depth $L_1$ of the recess 84 ahead of the portion 88 is slightly less than $R_1$. The exemplary recess 86 has more complex curvature. A central base portion 200 of the recess has a relatively large radius of curvature $R_2$. Outboard aft portions 202 extending forward from the surface 88 are essentially straight and longitudinal. Transition portions 204 between the portion 200 and portion 202 have a relatively small radius of curvature $R_3$. The recess 86 has a width $W_2$ at the surface 88 and a depth $L_2$. As one parameter of the broadness of the recess 86, the recess has a width $W_3$ at the longitudinal position of the axes 510 which is relatively close to $W_2$. In the exemplary embodiment, the first recess depth $L_1$ is slightly less than the second recess depth $L_2$, leaving a correspondingly greater mounting portion length $L_3$ ahead of the first recess than $L_4$ ahead of the second recess.

In an exemplary implementation, a flange radius along the outboard surface of the mounting portion 60 is 9.58 inches, a thickness of the mounting portion is 0.131 inches, a length of the mounting portion 60 is 0.5375 inch, and there are twenty pairs of mounting apertures. The mounting apertures have a nominal diameter of 0.11 inch, with a diameter at the chamfer of 0.16 inch. The separations $S_1$, $S_2$ and $S_3$ are 0.719, 0.786, and 0.117 inch. The longitudinal spans $L_3$ and $L_4$ are 0.115 and 0.075 inch. The radius $R_1$ is 0.21 inch and the separation $S_4$ is 0.025 inch. The radii $R_2$ and $R_3$ are 0.575 and 0.13 inch. The widths $W_1$, $W_2$, and $W_3$ are 0.417, 0.490, and 0.478 inch. In the exemplary embodiment the depth and breadth of the recess 86 serves to reduce weight and hoop stresses at the circumferential ends of the weight mounting areas. The recesses 84 serve primarily for weight reduction as hoop stress reduction is not as great a concern within individual weight mounting areas. The partial circle shape of the recesses 84 reflects ease of machining (e.g., through use of simpler, less expensive, and/or more robust machining cutter and/or reduced use of the cutter). Although potentially advantageous from a weight reduction point of view, the benefits of making the recesses 84 similar to the recesses 86 might not be worth the additional manufacturing costs.

FIG. 5 further shows, in broken line, the rim 158 of the prior art flange 150. The mounting apertures and shoulder of such flange are coincident with those of the flange 50 and are not separately illustrated. The base of the recess 186 is forward of the base of the recess 86. Accordingly, in the manufacturing process the rim flat portion 188 may be machined down to coincident with the rim flat portion 88 and additional recesses may be machined coincident with the recesses 84. The recess 186 may be machined to provide a recess 86'. The recess 86' is broader and substantially blunter than the baseline recess 186. The width at the rim (same as $W_2$) may be slightly larger than the corresponding baseline dimension $W_4$ (e.g., by 5–15%). The width between apertures (analogous to $W_3$, but equal to $W_2$ in the illustrated embodiment) is advantageously substantially larger (e.g., by 30–80%) than the corresponding baseline dimension $W_5$. The exemplary recess 86' is deeper than the recess 86. In the exemplary embodiment, the depth of the recess 86' is chosen to be slightly deeper than the baseline recess 186. The exemplary recess 86 is not so deep in order to limit manufacturing costs. Although potentially advantageous, the benefits of making the recesses 86 similar to the recesses 86' might not be worth the additional manufacturing costs.

One or more embodiments of the present invention have been described. Nevertheless, it will be understood that various modifications may be made without departing from the spirit and scope of the invention. For example, the principles may be applied to various turbine configurations. Accordingly, other embodiments are within the scope of the following claims.

What is claimed is:

1. A turbine engine disk comprising:
    an at least partially radially-extending first portion; and
    an at least partially axially-extending circumferential flange having:
        a root connecting the flange to the first portion;
        a rim;
        a plurality of pairs of first and second weight-mounting fastener apertures;
        a plurality of first recesses in said rim, each positioned between an associated first and second aperture of an associated one of said pairs; and
        a plurality of second recesses in said rim each positioned between an associated first aperture of an associated first one of said pairs and an associated second aperture of an associated second one of said pairs, adjacent said first one of said pairs.

2. The disk of claim 1 wherein the second recesses are deeper than the first recesses.

3. The disk of claim 1 wherein along inboard and outboard surfaces of the flange at an axial location of said apertures, the second recesses are broader than the first recesses.

4. The disk of claim 1 further comprising:
    a first weight secured to the disk by: a first fastener engaging said first fastener aperture of an associated one of said pairs; and a second fastener engaging said second fastener aperture of said associated one of said pairs.

5. A method for remanufacturing a turbine disk, the disk initially comprising:
    an at least partially radially-extending first portion; and
    an at least partially axially-extending circumferential flange having:
        a root connecting the flange to the first portion;
        a rim;
        a plurality of pairs of first and second weight-mounting fastener apertures; and
        a plurality of first recesses in said rim, each positioned between an associated first aperture of an associated first one of said pairs and an adjacent associated second aperture of an adjacent associated second one of said pairs, the method comprising:

machining a plurality of second recesses in said rim each positioned between an associated first and second aperture of an associated one of said pairs.

6. The method of claim 5 further comprising:

removing the disk from a turbine engine before said machining.

7. The method of claim 5 further comprising:

broadening said first recesses.

8. The method of claim 5 further comprising:

trimming said rim so as to bring the rim closer to axes of the first and second weight-mounting fastener apertures.

9. The method of claim 5 further comprising:

removing weights from the disk before the machining; and installing weights on the disk after the machining.

10. A method for remanufacturing a turbine disk, the disk initially comprising:

an at least partially radially-extending first portion; and an at least partially axially-extending circumferential flange having:

a root connecting the flange to the first portion;

a rim;

a plurality of pairs of first and second weight-mounting fastener apertures; and a plurality of first recesses in said rim, each positioned between an associated first aperture of an associated first one of said pairs and an adjacent associated second aperture of an associated second one of said pairs, the method comprising:

broadening said first recesses.

11. The method of claim 10 wherein the broadening occurs at least at a longitudinal location between axes of the weight-mounting fastener apertures.

12. The method of claim 10 further comprising:

removing weights from the disk before the broadening; and installing weights on the disk alter the broadening.

13. The method of claim 10 further comprising installing weights on the disk after the broadening by securing each weight to the disk by: a first fastener engaging said first fastener aperture of an associated one of said pairs; and a second fastener engaging said second fastener aperture of said associated one of said pairs.

14. A turbine engine disk comprising:

an at least partially radially-extending first portion; and an at least partially axially-extending circumferential flange having:

a root connecting the flange to the first portion;

a rim;

a plurality of pairs of first and second weight-mounting fastener apertures;

a plurality of first recesses in said rim, each positioned between an associated first and second aperture of an associated one of said pairs; and a plurality of second recesses in said rim each positioned between an associated first aperture of an associated first one of said pairs and an associated second aperture of an associated second one of said pairs, wherein the second recesses are deeper than the first recesses.

15. The disk of claim 14 wherein along inboard and outboard surfaces of the flange at an axial location of said apertures, the second recesses are broader than the first recesses.

16. The disk of claim 14 further comprising:

a first weight secured to the disk by: a first fastener engaging said first fastener aperture of an associated one of said pairs; and a second fastener engaging said second fastener aperture of said associated one of said pair.

17. A turbine engine disk comprising:

an at least partially radially-extending first portion; and an at least partially axially-extending circumferential flange having:

a root connecting the flange to the first portion;

a rim;

a plurality of pairs of first and second weight-mounting fastener apertures;

a plurality of first recesses in said rim, each positioned between an associated first and second aperture of an associated one of said pairs; and a plurality of second recesses in said rim each positioned between an associated first aperture of an associated first one of said pairs and an associated second aperture of an associated second one of said pairs, wherein along inboard and outboard surfaces of the flange at an axial location of said apertures, the second recesses are broader than the first recesses.

18. The disk of claim 17 further comprising:

a first weight secured to the disk by: a first fastener engaging said first fastener aperture of an associated one of said pairs; and a second fastener engaging said second fastener aperture of said associated one of said pairs.

19. A method for remanufacturing a turbine disk, the disk comprising:

an at least partially radially-extending first portion; and an at least partially axially-extending circumferential flange having:

a root connecting the flange to the first portion;

a rim;

a plurality of pairs of first and second weight-mounting fastener apertures; and a plurality of first recesses in said rim, each positioned between an associated first aperture of an associated first one of said pairs and an adjacent associated second aperture of an associated second one of said pairs, the method comprising:

machining a plurality of second recesses in said rim each positioned between an associated first and second aperture of an associated one of said pairs; and trimming said rim so as to bring the rim closer to axes of the first and second weight-mounting fastener apertures.

20. A method for remanufacturing a turbine disk, the disk comprising:

an at least partially radially-extending first portion; and an at least partially axially-extending circumferential flange having:

a root connecting the flange to the first portion;

a rim;

a plurality of pairs of first and second weight-mounting fastener apertures; and a plurality of first recesses in said rim, each positioned between an associated first aperture of an associated first one of said pairs and an adjacent associated second aperture of an associated second one of said pairs, the method comprising:
broadening said first recesses at least at a longitudinal location between axes of the weight-mounting fastener apertures.

21. A method for remanufacturing a turbine disk, the method comprising:
providing a disk initially having:
an at least partially radially-extending first portion; and
an at least partially axially-extending circumferential flange having:
a root connecting the flange to the first portion;
a rim;
a plurality of pairs of first and second weight-mounting fastener apertures; and
a plurality of first recesses in said rim, each positioned between an associated first aperture of an associated first one of said pairs and an adjacent associated second aperture of an associated second one of said pairs and broadening said first recesses.

* * * * *